Nov. 17, 1970     D. E. HAGGAN     3,541,436

RESISTANCE INDICATOR USING AN OPERATIONAL AMPLIFIER

Filed Feb. 8, 1968

INVENTOR.
DOUGLAS E. HAGGAN
BY
AGENT

United States Patent Office

3,541,436
Patented Nov. 17, 1970

---

3,541,436
RESISTANCE INDICATOR USING AN OPERATIONAL AMPLIFIER
Douglas E. Haggan, Summerville, N.J., assignor to Burroughs Corporation, Detroit, Mich., a corporation of Michigan
Filed Feb. 8, 1968, Ser. No. 703,937
Int. Cl. G01r 27/02
U.S. Cl. 324—62                        7 Claims

---

ABSTRACT OF THE DISCLOSURE

A resistance testing device for indicating on a "go no-go" basis whether an unknown resistance is above or below a predetermined value. The voltage developd across the resistance under test is applied to the differential inputs of an operational amplifier having a high input impedance and an easily adjustable sensitivity. The output of the operational amplifier is connected through a temperature compensating emitter-follower transistor to another transistor which compares the operational amplifier output with a reference voltage established by a Zener diode and controls an indicator lamp. The circuit combination is particularly useful for testing low value resistances less than one ohm.

---

BACKGROUND OF THE INVENTION

In manufacturing and servicing electronic components and circuitry, it is often necessary to measure resistances accurately and rapidly. For example, during the process of inspecting multilayer printed circuit boards, the resistance of certain critical runs therein must be measured to insure that they fall below a predetermined low resistance value, in the order of one ohm or less. The testing of the circuit boards may be performed by reading a digital ohmmeter or other similar instrument; however, in order to minimize the interpretation required by an inspection line operator, it is preferable to provide a "go no-go" resistance indication by the on-off condition of a lamp or a buzzer, for example.

Resistance testers for measuring resistances in terms of a simple on-off visual or audible indication are presently known in a variety of configurations. For example, in one type of measuring device, the voltage developed across a resistor under test as a result of current flowing therethrough is applied directly to a threshold responsive Zener diode or voltage sensitive relay. This diode or relay may be connected through suitable transistor switching circuitry to a lamp or buzzer. When the resistance under test is above a predetermined value, the voltage across it exceeds the threshold level ot the diode or relay, which in turn causes a lamp to light or a buzzer to sound. This system has the disadvantage that it generally lacks low voltage sensitivity and therefore cannot be used to measure resistances in the order of a few tenths of an ohm. Also, this type of circuit undesirably loads the resistance under test, and may subject it to harmful transient voltage spikes, especially when a highly inductive, voltage sensitive, relay coil is used.

In another type of test system, the voltage developed across a resistance under test is applied directly to the control input of a single transistor operating in an amplifying mode. This transistor in turn controls suitable transistor switching circuitry which energizes a lamp for visually indicating when the resistance is above or below a predetermined value. This system has the disadvantage that its voltage sensitivity is limited by the relatively low gain of a single stage transistor amplifier. The transistor amplifier has a relatively low input impedance, so the test circuit adversely loads the resistance under test, and an accurate measurement thereof is not possible. Due to the fact that the parameters of commercially available transistors are not constant, reliable resistance measurements can be achieved only at the expense of frequent and time consuming calibration of the test circuit. Additionally, this type of circuit is generally not adjustable, so that a broad range of resistances cannot be tested without sacrificing circuit sensitivity and accuracy.

OBJECTIVES AND SUMMARY OF THE INVENTION

In view of the deficiencies of prior art devices pointed out above, it is an object of this invention to provide an improved voltage measuring device utilizable as a resistance tester and having a high input sensitivity for accurately and quickly indicating voltage or resistance values on a simple "go no-go" basis.

It is another objects of this invention to provide a voltage or resistance testing device having high voltage sensitivity and stable operation unaffected by variations of temperature or component parameters over normal limits.

It is a further object of the present invention to provide resistance testing circuit means for measuring low value resistances in the order of a few tenths of an ohm without adversely loading the resistance under test.

It is a still further object of this invention to provide a resistance testing or voltage measuring device which is easily adjustable for obtaining accurate measurements over a broad range of values.

In accordance with the foregoing objects and other desirable purposes, applicant has invented a device for indicating the value of an unknown resistance by measuring the voltage developed across the resistance as a result of a constant current passed through it. The circuitry of the invention comprises the combination of operational amplifier means having differential input terminals connected across an unknown resistance, detecting circuitry including means for comparing the output signal from the operational amplifier with a predetermined reference voltage, and indicator means responsive to the output of the comparing means for signifying whether the unknown resistance under test is above or below a predetermined value. A main feature of this inventive combination is that the operational amplifier has a high input impedance and a high gain, and is easily adjustable to accommodate different resistance ranges in varying degrees of sensitivity by adjusting the input and feed-back resistors of the operational amplifier.

DESCRIPTION OF THE PREFERRED EMBODIMENT

Figure 1:
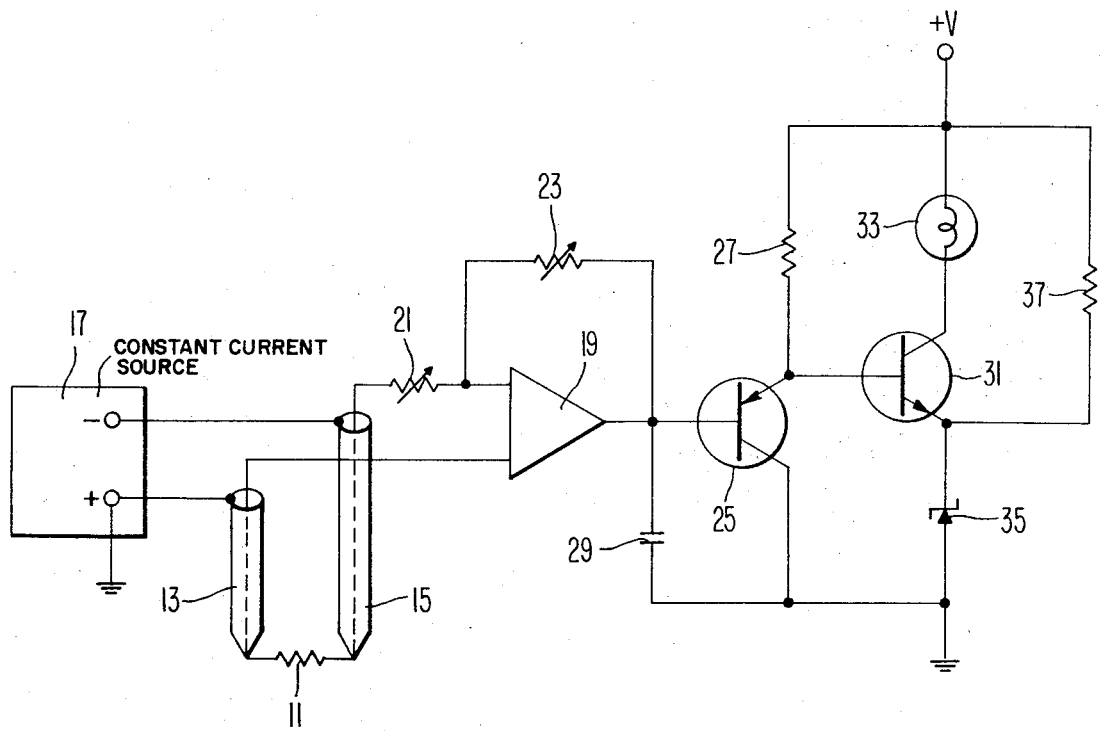
FIG. 1 is a combined block and schematic diagram of the preferred embodiment of the resistance testing device comprising applicant's invention.

Referring now to FIG. 1, there is shown a resistance 11 of unknown value, which is probed by a pair of coaxial leads or test probes 13 and 15, each having an outer shielding conductor and an inner conductor. There is provided a constant current power source 17 having a grounded positive terminal and a negative terminal connected respectively to the outer conductors of leads 13 and 15 for passing a constant current through the unknown resistance 11. The voltage developed across the resistance 11 as a result of the constant current passed therethrough is sensed by the center conductors of the leads and 15. These center conductors form a junction with their respective outer shielding conductors at the points of contact with the unknown resistance 11.

The voltage sensed across the unknown resistance 11 is applied to an amplifier 19 having a pair of differential inputs, one of which is connected directly to the center conductor of test probe 13, and the other of which is connected through a variable input resistor 21 to the center conductor of test probe 15. Amplifier 19 has an output terminal coupled through a variable feed-back resistor 23 to a junction point between resistor 21 and its corresponding input to the amplifier. The output of this amplifier is also connected to detecting means including comparing means and threshold responsive means, hereinafter described.

In the preferred embodiment of the invention, amplifier 19 is characterized by a high impedance between its differential input terminals in the range of one-half to one megohm, a relatively low output impedance of about 100 ohms, and a high amplification factor of about 60,000. The circuit configuration of amplifier 19, input resistor 21, and feed-back resistor 23 forms an operational amplifier having a stable gain which is not affected by adverse temperature or other environmental conditions, or by variations in its component parameters within reasonable limits. The amplifier 19 is of the signal inverting type and may assume any one of a variety of internal configurations, provided that it has a large input impedance and amplification factor. Also, it may include appropriate means for delaying the circuit reaction to input signals in order to insure against undesirable voltage transients. This delay may be provided by the RC time constant of a resistance-capacitance network. Preferably the amplifier is an integrated circuit which features the advantages of compact size, commercial availability, and low cost.

Figure 2:
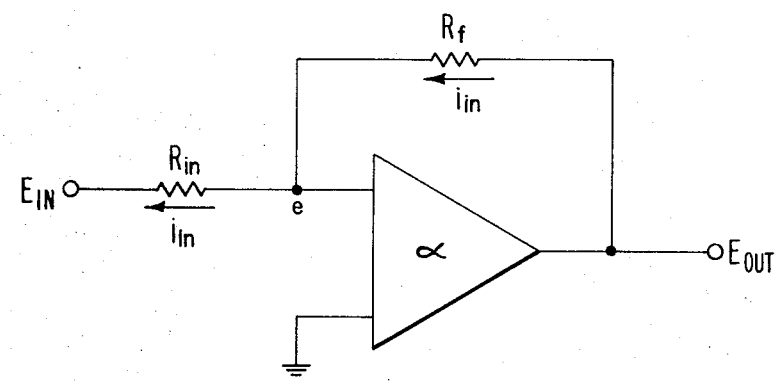
FIG. 2 is a schematic diagram used to develop the mathematical expressions relating to the operation of a portion of applicant's novel resistance testing device.

The overall closed loop gain of the operational amplifier is a function of the values of the resistors 21 and 23, as will become apparent in the mathematic development presented below. With reference to FIG. 2, the equations expressing the performance of the operational amplifier may be derived. Specifically, the voltage input $e$ is expressed as follows:

(1) $$e = E_{in} + i_{in} R_{in}$$

where $E_{in}$ is the sensed negative input voltage from the center conductor of test probe 15, $R_{in}$ is the input resistance corresponding to resistor 21 in FIG. 1, and $i_{in}$ is the current flowing through the resistance $R_{in}$ in the direction of the arrow in FIG. 2.

By transposing the terms of the above equation, the following expression for $i_{in}$ may be found:

(2) $$i_n = \frac{e - E_{in}}{R_{in}}$$

Since the amplifier has a high input impedance, the current flowing through the resistance $R_{in}$ will be substantially the same as the current through the feed-back resistance $R_f$. Therefor the following expression for the amplifier output voltage $E_{out}$ may be derived:

(3) $$E_{out} = e + i_{in} R_f$$

When Equation 3 is solved for the current $i_{in}$, the following result is obtained:

(4) $$i_{in} = \frac{E_{out} - e}{R_f}$$

By equating the right hand terms of Equations 2 and 4, the following result is obtained:

(5) $$\frac{E_{out} - e}{R_f} = \frac{e - E_{in}}{R_{in}}$$

The amplifier output voltage $E_{out}$ may be expressed in terms of its amplification factor $\alpha$ and its input voltage $e$, as follows:

(6) $$E_{out} = e\alpha$$

By solving Equation 6 for the voltage $e$ and substituting the expression therefor into Equation 5 and transposing terms, the following expression is derived:

(7) $$\frac{E_{out} - E_{out}/\alpha}{E_{out}/\alpha - E_{in}} = \frac{R_f}{R_{in}}$$

For large values of the amplification factor, the term $E_{out}/\alpha$ approaches zero. Therefore Equation 7 may be simplified, with the following result:

(8) $$\frac{E_{out}}{E_{in}} = -\frac{R_f}{R_{in}}$$

The closed loop gain of the operational amplifier is represented by Equation 8 with the minus sign indicating that the input signal is inverted. It can be seen from this equation that this gain is dependent upon the ratio of the feed-back resistance $R_f$ and the input resistance $R_{in}$. As shown in FIG. 1, these two resistances correspond respectively to the variable resistors 23 and 21. Since these two resistors are adjustable, the sensitivity of the operational amplifier may be easily varied, and a wide range of unknown resistances may be tested.

The voltage signal output from the amplifier 19 is an analog representation of the value of the unknown resistance 11. This output signal is applied to detecting means for determining whether the signal is above or below a predetermined level. The detecting means includes a voltage reference source, means for comparing the amplifier output signal with this voltage reference, and means responsive to the comparing means for indicating by the on-off condition of a lamp for example whether the unknown resistance is above or below a predetermined value. Specifically, the output of amplifier 19 is coupled to the base of a PNP transistor 25 connected in an emitter-follower configuration. This transistor has its collector connected to ground or a reference potential, and its emitter electrode connected through a resistor 27 to a source of positive potential, +V. A capacitor 29 is connected between the base and collector electrodes of this transistor to absorb spurious voltage spikes and slow down the circuit reaction when the test probes 13 and 15 are positioned across an unknown resistance.

The emitter output electrode of transistor 25 is connected to the base of an NPN silicon transistor 31, which is temperature compensated by the action of the emitter-follower transistor 25. Transistor 31 has its collector electrode connected through an incandescent lamp 33 to the source of positive potential +V, and its emitter electrode connected to the cathode of a Zener diode 35. The anode of Zener diode 35 is connected to ground. The cathode of the Zener diode is also connected to the potential source +V through a resistor 37, which provides a current path through the Zener diode to maintain it conducting at its breakdown voltage.

Considering now the overall operation of the resistance testing circuit, when no resistance is connected between the test probes 13 and 15, the differential input of the amplifier 19 receives a negative voltage signal with reference to ground, which signal is amplified, inverted and applied as a positive signal through the emitter-follower transistor 25 to the comparing transistor 31. This positive signal is large enough to exceed the reference voltage established by the Zener diode 35 at the emitter of the comparing transistor 31, and thus the signal forward biases this transistor 31 into conduction to light the indicating lamp 33.

When the test probes are connected across an unknown resistance 11, the constant current source 17 establishes a voltage drop across this unknown resistance proportional to the value thereof. This voltage drop is amplified by the operational amplifier formed by the combination of amplifier 19, and adjustable resistors 21 and 23, and applied to the comparing transistor 31 in the previously described manner. If the unknown resistance 11 is below a predetermined value, the positive biasing signal applied to the comparing transistor 31 is less than the reference voltage established by the Zener diode 35 so that the comparing transistor is reversed biased, and the indicator lamp is not energized. Alternatively, if the unknown resistance is above the aforementioned predetermined value, the voltage at the base of the comparing transistor exceeds the Zener diode reference voltage to forward bias this transistor and energize the lamp. Therefore a lighted lamp indicates a high resistance condition, and a dark lamp indicates a low resistance condition.

It has been found that satisfactory circuit operation may be achieved with a following components when the positive potential source +V is set at 12 volts:

Amplifier 19—Motorola MC 1533 integrated circuit
Resistor 21—1000 ohms (variable)
Resistor 23—100,000 ohms (variable)
Transistor 25—2N3638
Resistor 27—10,000 ohms
Capacitor 29—0.1 mfd.
Transistor 31—2N3643
Lamp 33—No. 2180, 6.3 volts, 40 ma.
Zener diode 35—IN1766, 6 volts, 1 watt
Resistor 37—240 ohms As stated hereinabove, the resistance testing circuit features adaptability to a wide range of resistances, due to the fact that the closed loop gain of the operational amplifier may be easily preset to a desired value by adjusting the variable resistors 21 and 23. The selected gain is preferably between limits defined by the region of linear amplifier operation, as determined by the particular amplifier circuit configuration and the compensating components therein. The range of resistances capable of being tested may also be adjusted by programming the constant current source 17 to provide different steps of current flow through the unknown resistance 11. Additionally or alternatively, different ranges may be effected by selectively individually connecting one of a plurality of Zener diodes having different breakdown voltages in place of Zener diode 35.

The preset gain of the operational amplifier is stable and substantially independent of reasonable deviations in component parameters and environmental effects. Because of the gain stability and the high input impedance reflected to the test probes 13 and 15, the circuit has particular advantage in measuring very low resistances. For example, when the above listed component values are used, and a constant current of 200 milliamperes is passed through a resistance 11 having a value of 0.3 ohm, the output of amplifier 19 will be +6 volts, and the current through the series connection of Zener diode 35, transistor 31 and lamp 33 will be substantially zero. If the resistance 11 increases by approximately 0.01 ohm, the base biasing of transistor 31 rises about one volt, which is sufficient to forward bias transistor 31 into conduction and light the lamp 33. Thus, it can be seen that very small changes in an unknown resistance may be indicated on a "go no-go" basis.

I claim:
1. A device for testing an unknown resistance comprising:
   means for forcing a constant current through said unknown resistance,
   an operational amplifier having input terminals connectable to said unknown resistance and an output terminal, said operational amplifier also having an input resistance and feed-back resistance,
   a source of reference voltage, and
   semiconductor means directly connected to said output terminal of said operational amplifier for comparing said reference voltage with the output voltage signal from said operational amplifier,
   said means for comparing including means for generating a first discrete signal when said reference voltage is greater than said output voltage and for generating a second discrete signal when said reference voltage is less than said output voltage.

2. The apparatus of claim 1, wherein said operational amplifier input resistance and feed-back resistance are each adjustable to change the closed loop gain of said operational amplifier.

3. The apparatus of claim 1 wherein said means for forcing a constant current through said unknown resistance includes a constant current power source having a pair of output terminals, and a pair of coaxial test probes for making contact with said unknown resistance, each probe having a outer shielding conductor and an inner sensing conductor, said outer shielding conductors being connected respectively to the output terminals of said constant current power source, and said inner sensing conductors being connected to said operational amplifier input terminals.

4. The apparatus of claim 1, further including means for suppressing transient input signals to said operational amplifier, said suppressing means including capacitor by-pass means connected to the output of said operational amplifier for grounding spurious voltage spikes.

5. A device for testing a low value resistance comprising:
   means for forcing a constant current through said low value resistance,
   operational amplifier means for sensing the voltage developed across said low value resistance, said amplifier means including an output terminal and two differential input terminals connectable respectively to opposite ends of said low value resistance, said amplifier means having variable input and feed-back resistance means for controlling its input sensitivity,
   means for detecting when the output from said amplifier means is above or below a predetermined voltage level, said detecting means inclduing,
   means for establishing a reference voltage, and means for comparing said reference voltage with the output voltage of said amplifier means, said comparing means including a transistor having a control electrode connected to said operational amplifier output terminal and two main current carrying electrodes connected in a series current path with said means for establishing a reference voltage, said transistor being biased into conduction when the output voltage of said amplifier exceeds said reference voltage, and means for visually indicating the flow of current through said current path.

6. The resistance testing device of claim 5, further including temperature compensating emitter-follower transistor means for interconnecting the output terminal of said operational amplifier and the control input to said comparing means.

7. The device of claim 5 wherein said means for establishing a reference voltage is a back biased Zener diode.

References Cited

UNITED STATES PATENTS

| | | | |
|---|---|---|---|
| 2,900,458 | 8/1959 | Rawdin | 330—108 |
| 2,955,259 | 10/1960 | Lax | 330—28 |
| 3,225,298 | 12/1965 | Cochran | 324—62 |
| 3,229,200 | 1/1966 | Rayburn | 324—62 |
| 3,278,849 | 10/1966 | Emery | 324—158 |
| 2,958,823 | 11/1960 | Rabier | 324—133 |
| 3,179,248 | 4/1965 | Manley. | |

OTHER REFERENCES

Thornton, B. M., and Wm. Thornton: The Measurement of the Thickness of Metal Walls From One Surface Only, By An Electrical Method, in Proceedings: Institution of Mechanical Engineers (London), vol. 140, Oct.-Dec. 1938, p. 356, TJIT52.

E. E. KUBASIEWICZ, Primary Examiner